United States Patent [19]

Barnwell et al.

[11] 4,026,534
[45] May 31, 1977

[54] SHOCK ABSORBER

[75] Inventors: J. H. Barnwell; M. T. Wilkinson, both of Ruston, La.

[73] Assignee: Department of Mechanical Engineering Louisiana Tech University, Ruston, La.

[22] Filed: Feb. 2, 1976

[21] Appl. No.: 654,085

[52] U.S. Cl. .............................. 267/139; 267/152; 293/84; 293/88; 293/89
[51] Int. Cl.² ........................................ B60R 19/08
[58] Field of Search .......... 267/140, 139, 158, 182, 267/154, 30, 157, 69 A; 293/66, 84, 87, 89, 88, 72, 85, 91, 92, 93, 94, 99, 70, 71; 61/48; 114/219; 280/106 R

[56] References Cited
UNITED STATES PATENTS

| | | |
|---|---|---|
| 1,839,015 | 12/1931 | Deveaux ............................. 293/88 |
| 3,663,048 | 5/1972 | Zimmerle ........................... 293/84 |
| 3,730,509 | 5/1973 | Jorn ................................... 267/152 |
| 3,773,372 | 11/1973 | Hebert ................................ 293/89 |
| 3,814,470 | 6/1974 | Kircher et al. .................... 267/139 |
| 3,834,686 | 9/1974 | Moritz et al. ...................... 267/139 |

*Primary Examiner*—James B. Marbert
*Attorney, Agent, or Firm*—John M. Harrison

[57] ABSTRACT

A shock absorber having alternate layers of a viscoelastic material and thin leaf springs disposed between, and having each end mounted on a pair of parallel side members which are disposed to undergo translative movement when the shock absorber is forced into either a compressed or an extended position. The layers of viscoelastic material and leaf springs are loaded as fixed end beams in the compressed and extended position, and return to the neutral position because of the spring constant in the leaf springs when a load is removed.

10 Claims, 3 Drawing Figures

SHOCK ABSORBER

BACKGROUND OF THE INVENTION

1. Field of the Invention

This invention relates to a new and improved shock absorber, and more particularly, to a new and improved shock absorber characterized generally by viscous damping as opposed to coulomb damping. The shock absorber of this invention may be used in substantially any application where viscous damping is required and under circumstances where hydraulic fluid leakage would be unsatisfactory or intolerble.

Because the basic damping stack or body lamination of this invention is made up of both leaf springs and viscoelastic sheets, the damping unit will always be characterized by a spring constant as well as a coefficient of viscous damping. Thus, a shock absorbing unit can be designed according to the teaching of this invention to resist large static and dynamic force and also to absorb, without damage, a large amount of dynamic energy in an aspect situation. Hence the shock absorber is highly suitable for such applications as automobile bumpers. In such an application, the damping feature of the invention would permit a bumper to handle, without damage, higher vehicle speeds (just prior to impact) than could be sustained by any purely spring supported bumper. Furthermore, because of the spring leaf feature of the shock absorber the unit would be capable of handling ordinary vehicle pushing and nudging operations that are commonly encountered in the daily use of an automobile.

2. Description of the Prior Art

Heretofore, many attempts have been made to provide shock absorbers chiefly characterized by non coulomb damping. For example, the conventional shock absorbing devices used on automobiles and other vehicles are generally designed for use in cooperation with hydraulic fluid or air as the damping vehicle. Other areas of investigation have included such efforts as that disclosed in U.S. Pat. No. 3,809,420 to Peter A. Weller, which includes an energy absorbing bumper assembly having at least one elongated inner member and a pair of similarly elongated outer members which are disposed in parallel relationship to the inner member and on opposite sides thereof. The inner member is connected to each of the outer members by a plurality of spaced, parallel energy absorbing elements oriented at an acute angle with respect to the members being connected. The structure is, in effect, a plurality of parallelogram members and the individual cells of these members may be filled with an elastomeric material.

U.S. Pat. No. 2,661,943 to L. S. Wilbur discloses a similar cushioning device which includes a plurality of resilient metal layers spaced by alternate layers of a compressible material to form a shock absorber which will assume its original position when an applied load is removed. The layers of metal are formed with ribs or corregations designed to space the plates in the stack.

One of the disadvantages characteristic of non coulomb-type shock absorbers incurrent use is that of leakage of hydraulic fluid from the interior of the device. Not only does such leakage render the cushioning device inoperative, but the spilled hydraulic fluid frequently coats equipment and other machine parts and belts with a film which at best is difficult to remove, and at worst can be detrimental to the adjacent mechanisms. In the case of air actuated shock absorbers, rubber boots must be utilized to maintain a functional air pressure in the device, and such boots are subject to failure due to stress fatigue, oil or other liquid attack, and abrasion.

While the non coulomb shock absorbing devices such as those illustrated in U.S. Pat. Nos. 3,809,420 and 2,661,943 appear to be effective in absorbing the shock of loads of varying description, the disclosure in U.S. Pat. No. 3,809,420 is relatively complex and appears subject to permanent deformation, while the device illustrated in U.S. Pat. No. 2,661,943 appears to be chiefly applicable to absorption of static loads in a compression configuration.

Accordingly, it is an object of this invention to provide a shock absorber which is capable of damping both static and dynamic forces, including oscillating forces, in a flexure operation which approaches true viscous damping.

Another object of the invention is to provide a shock absorber which is characterized by alternate rectangular laminations of a viscoelastic material and leaf springs which operate by flexure between a pair of parallel end members to provide a shock absorbing function as the layers flex and the end members move in relative translation.

Yet another object of the invention is to provide a new and improved shock absorber which is characterized by layers of leaf spring having a spring constant and layers of a viscoelastic material having the approximate characteristics of viscous damping to permit the shock absorber to extnd and compress in flexure rather than compression, and to return automatically to a neutral position when a given load is first applied and then removed.

A still further object of the invention is to provide an improved shock absorber which approaches true viscous damping, the end members of which undergo curvilinear translation and the alternate layers of viscoelastic material and spring steel of which undergo flexure as fixed end beams when the shock absorber is either compressed or extended by application of a load.

Another object of the invention is to provide a shock absorber which can be adjusted to damp substantially any given load by inserting or removing layers of either or both the viscoelastic material and the spring steel to provide a selected and appropriate shock absorbing function.

Yet another object of the invention is to provide a shock absorbing device which is capable of functioning both as a shock absorber and as a spring support for a vehicle or in other desired load support applications.

A still further object of the invention is to provide a shock absorber which is designed to extend and compress under load and to resume a neutral design configuration when unloaded.

SUMMARY OF THE INVENTION

These and other objects of the invention are provided in a shock absorber which includes the following elements:

1. A body lamination including a plurality of rectangular, adjacent sections of a viscoelastic material and leaf springs;

2. A pair of side members disposed in parallel relationship to each other and each having one end of the body lamination securely, but removably attached thereto;

3. A pair of spacer bars disposed on either side of the body lamination and pivoted at each end to the side members; and 4. Mounting brackets fitted to one end of one side member and the opposite end of the opposing side member.

BRIEF DESCRIPTION OF THE DRAWINGS

The invention will be better understood in view of the following description presented with reference to the accompanying drawings.

DESCRIPTION OF THE PREFERRED EMBODIMENTS

Figure 1:
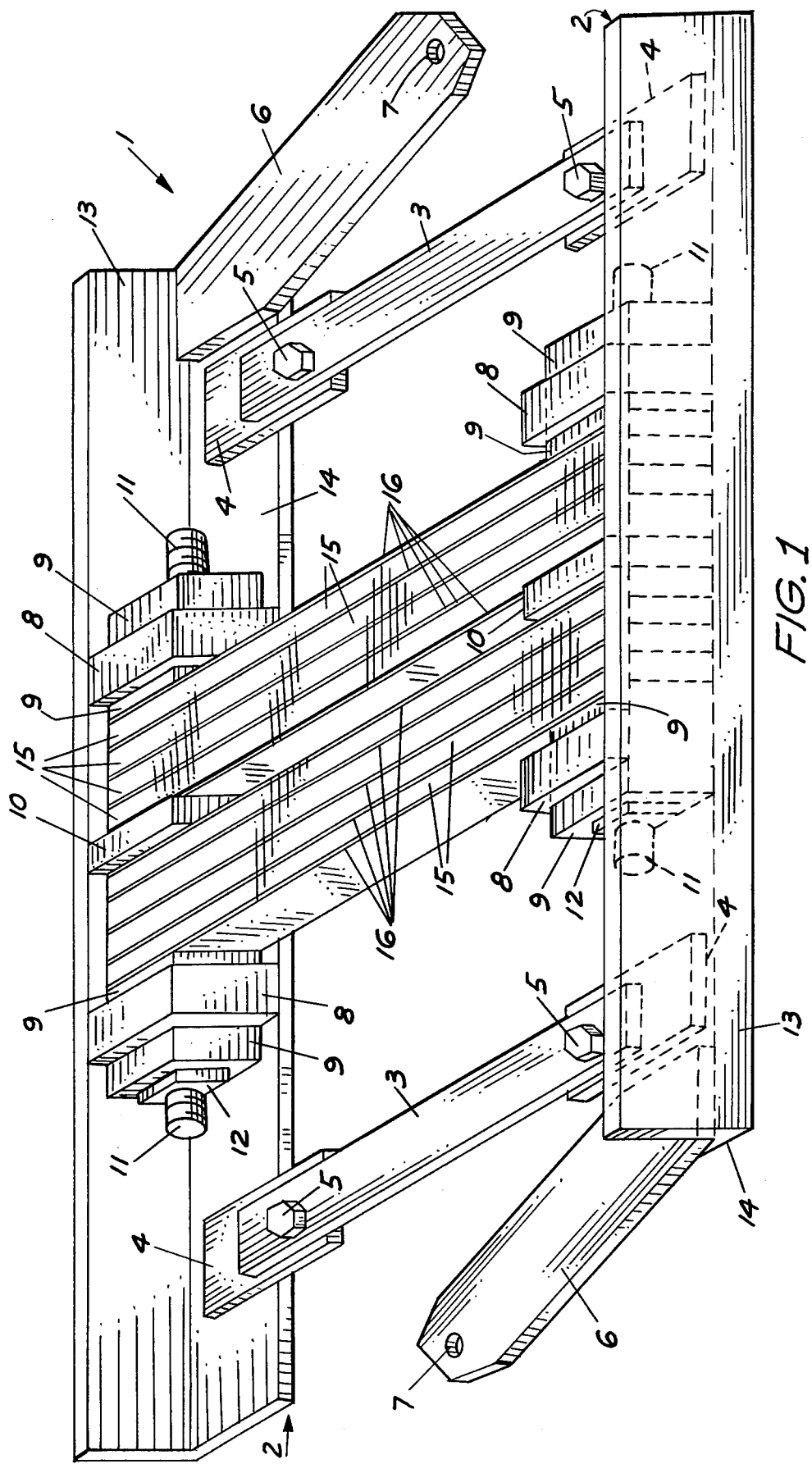
FIG. 1 of the drawings is a perspective view of the shock absorber of this invention illustrated in a neutral, non-loaded configuration.

Referring now to FIG. 1 of the drawings, the shock absorber of this invention, shown in neutral or non-loaded configuration, is generally illustrated by reference numeral 1. Shock absorber 1 includes side members 2, which are constrained to remain parallel to each other when shock absorber 1 is loaded by operation of cooperating spacer bars 3 which are pivotally attached to spacer brackets 4, welded or bolted to side members 2. Spacer bars 3 designed to pivot on spacer bracket bolts 5 when the shock absorber is loaded, as hereinafter noted. Mounting brackets 6 are provided on opposite ends of shock absorber 1 and are welded or bolted to horizontal legs 14 of each of side members 2. Mounting bracket apertures 7 are provided for bolting the shock absorber onto the frame of a vehicle or other equipment.

Alternate layers of viscoelastic laminations 15 and leaf springs 16 are provided between, and are disposed in essentially perpendicular relationship to side members 2, as illustrated. The body lamination is positioned securely between clamping blocks 9, which are held in alignment by anchor brackets 8, welded or otherwise mounted on vertical legs 13 and horizontal legs 14 of side members 2. Anchor brackets 8 are shaped to removably receive clamping blocks 9 as illustrated. Viscoelastic laminations 15 and leaf springs 16 are secured inplace between clamping blocks 9 by means of mounting bolts 11, and retaining nuts 12. Anchor brackets 8 hold clamping blocks 9 in line, as illustrated. Spacer plates 10 are welded or bolted to vertical legs 13 and horizontal legs 14 and also serve to help anchor viscoelastic laminations 15 and leaf springs 16, in addition to permitting additional freedom of the body lamination to bend and flex when shock absorber 1 is loaded in tension or compression.

Figure 2:
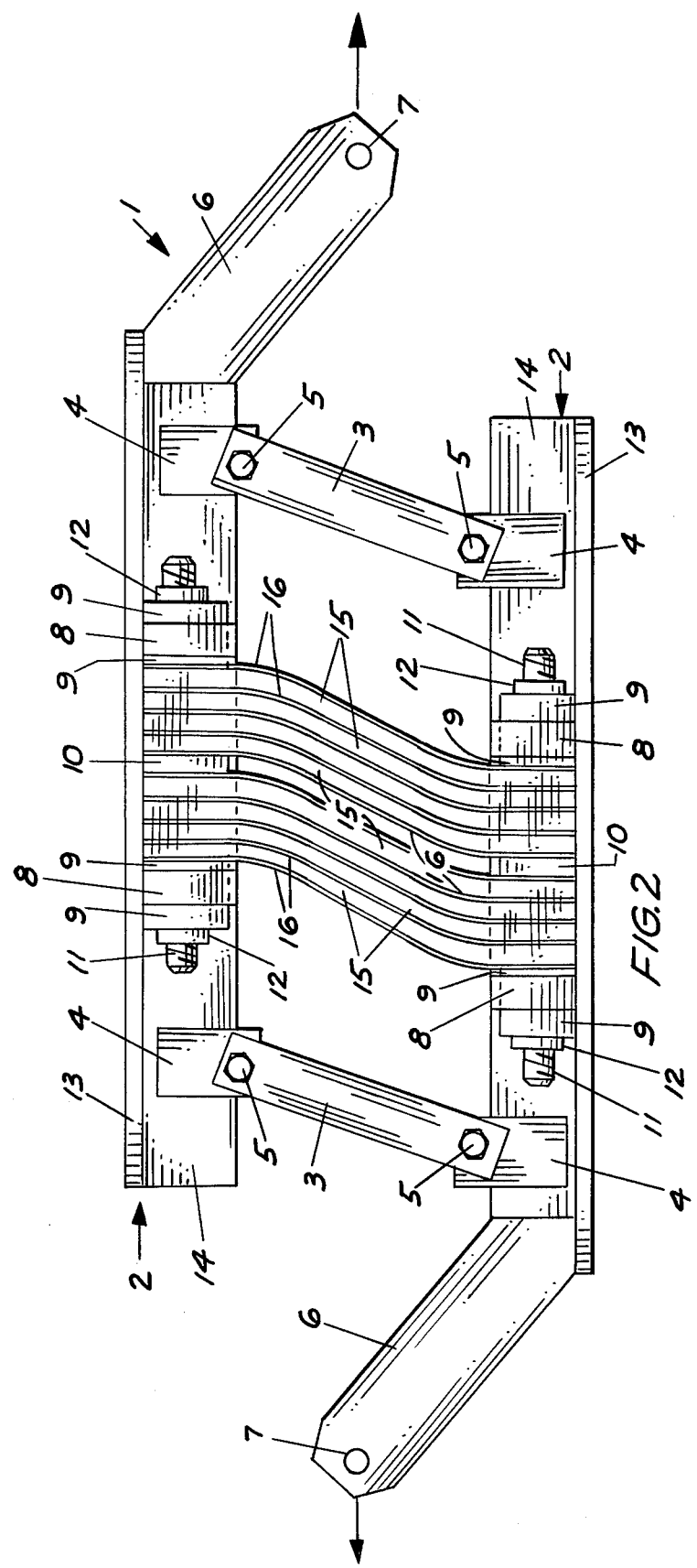
FIG. 2 is a top elevation of the shock absorber illustrated in FIG. 1 in extended configuration showing an application of tension loading.

Referring now to FIG. 2 of the drawing, shock absorber 1 is illustrated in extended configuration when a tension load is applied as indicated by the arrows. It will be appreciated by analysis of the relative movement of side members 2 that these members move in parallel, curvilinear translation under load, the degree of curvature of which can be increased or decreased, as desired, by either shortening or lengthening spacer bars 3. It has been found in a preferred embodiment of the invention that the length of spacer bars 3 should be accurately calculated in order to produce a slight amount of linear prestressing, and particularly, compression, on viscoelastic laminations 15 and leaf springs 16 in order to insure that leaf springs 15 do not receive excessive deformation which might result in a permanent "set" or fatigue in the reion adjacent to side members 2 when shock absorber 1 is loaded in either tension or in compression. This compressive action on the body lamination has also been found to be necessary to prevent rapid failure of viscoelastic laminations 15 and leaf springs 16 in the flexing operation. While it is preferable to design shock absorber 1 such that the body lamination is in compression when shock absorber 1 is not loaded as illustrated in FIG. 1, it will be appreciated that the shock absorber may easily be constructed to place the body lamination in tension while unloaded, should the selection of particular material to form viscoelastic laminations 15 and leaf springs 16 require such prestressing in order to function effectively.

Figure 3:
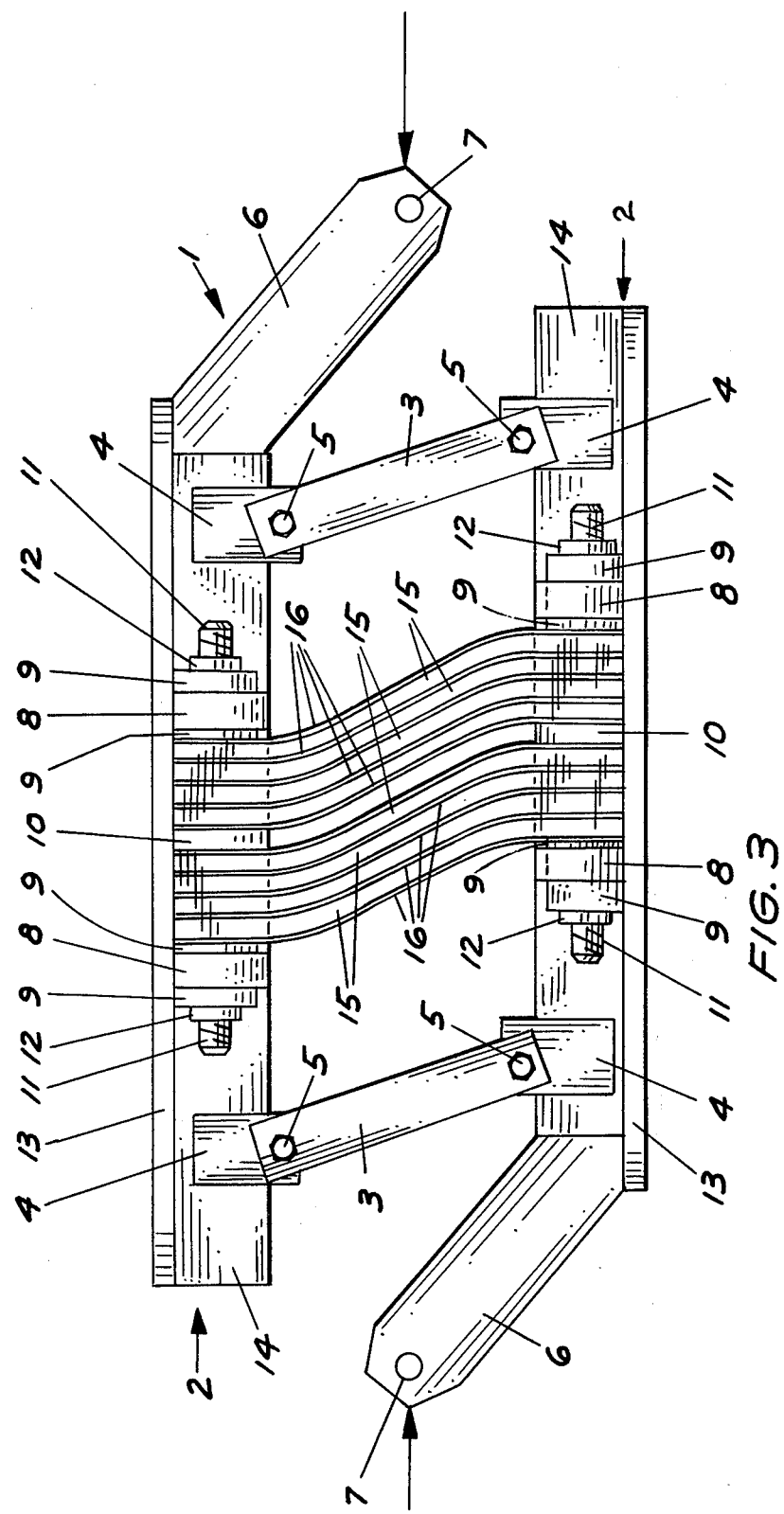
FIG. 3 is a top elevation of the shock absorber illustrated in FIGS. 1 and 2 in compression.

Referring now to FIG. 3 of the drawing, shock absorber 1 is illustrated under the influence of a compressive load as indicated by the arrows. As in the case of tension loading illustrated in FIG. 2, viscoelastic laminations 15 and leaf springs 6 are loaded as fixed end beams as side members 2 move in curvilinear translation, and are constrained to remain parallel to each other by the pivoting action of spacer bars 3.

It is significant that shock absorber 1 can be adjusted to handle substantially any load, whether static or dynamic, by simply adding or taking away viscoelastic laminations 15 or leaf springs 16, or both, as desired. If a high spring constant is desired, additional segments of leaf springs 16 may be added, or thicker springs may be utilized. Such action insures that shock absorber 1 will quickly return to its original neutral and non-loaded condition as illustrated in FIG. 1 when either an applied tensile or compressive load is removed. Furthermore, if a higher degree of damping or resistance to impact is desired, either more or thicker viscoelastic laminations can be used. A selected spring constant and coefficient of viscous damping can therefore be achieved for substantially any given loading conditions by varying the size and number of viscoelastic laminations 15 and leaf springs 16 in a given shock absorber system. Addition or removal of viscoelastic laminations 15 and leaf springs 16 is easily accomplished by removing retaining nuts 12 from each end of the mounting bolts 11, removing clamping blocks 9, removing mounting bolts 11 from registration with spacer plates 10 and the ends of viscoelastic laminations 15 and leaf springs 16, and effecting the desired modification.

Additional integrity and stability can be built into the shock absorber of this invention by impregnating wire mesh or an alternative strengthening material into viscoelastic laminations 15 where such application is deemed desirable. Since viscoelastic laminations 15 are formed of a readily moldable vibration damping material, it can be easily shaped or reinforced as desired for particular applications. The viscoelastic material can also generally be easily bonded to other materials such as steel to provide a bonded body lamination if it is deemed necessary or desirable to do so. The material is a solid, but acts like a liquid, in that it has viscous or damping qualities, and this feature is responsible for the fact that as the shock absorber is loaded either in tension or compression, the lamina flex rather than compress, to exhibit extremely good damping characteristics.

It will be appreciated that the mechanical configuration of the shock absorber of this invention as illustrated in FIGS. 1–3 of the drawing is but one of many suitable and preferred configurations which can be utilized. For example, side members 2 can be easily formed of bar stock, channel iron or the equivalent, the particular choice of stock being dictated only by considerations of strength, weight or both, for a given load application. A key factor in the invention is disposition of alternate layers of a viscoelastic material and metal leaf springs, or an equivalent material sufficient to supply a spring constant, between side members which move in parallel relationship when the shock absorber is placed under the influence of tension or compressive loading.

Accordingly, having described our invention with the particularity set forth above, what is claimed is:

1. A shock absorber comprising:
   a. a pair of side members of substantially equal length disposed in parallel relationship to each other;
   b. at least one lamination of a viscoelastic material and leaf spring in alternating configuration between said side members, and means carried by said side members for removably mounting the ends of said lamination to said side members, respectively; and
   c. a pair of spacer bars disposed in essentially parallel relationship to each other and having the ends thereof pivotally mounted on said side members.

2. The shock absorber of claim 1 wherein said at least one lamination is a plurality of laminations of said viscoelastic material and said leaf spring in alternating configuration.

3. The shock absorber of claim 1 wherein said at least one lamination of a viscoelastic material and leaf spring is bonded together.

4. The shock absorber of claim 1 wherein:
   a. said at least one lamination is a plurality of laminations of said viscoelastic material and said leaf spring in alternating configuration; and
   b. said at least one lamination of a viscoelastic material and leaf spring is bonded together.

5. The shock absorber of claim 1 wherein said means carried by said side members is a pair of anchor brackets mounted on each of said side members and a pair of clamping blocks in cooperation with said anchor brackets and said at least one lamination to removably secure said lamination between said side members.

6. The shock absorber of claim 1 wherein said means carried by said side member is a pair of anchor brackets mounted on each of said side members and a pair of clamping blocks in cooperation with said anchor brackets and said at least one lamination to removably secure said lamination between said side members and wherein:
   a. said at least one lamination is a plurality of laminations of said viscoelastic material and said leaf spring in alternating configuration; and
   b. said at least one lamination of a viscoelastic material and leaf spring is bonded together.

7. The shock absorber of claim 1 wherein said means carried by said side members is:
   a. a spacer plate and a pair of anchor brackets mounted on each of said side members;
   b. a pair of clamping blocks in registering cooperation with said pair of anchor brackets and fitted against the ends of said at least one lamination;
   c. a pair of mounting bolts positioned in registration with apertures in said clamping blocks, said spacer plate and said ends of said at least one lamination; and
   d. a pair of retaining nuts threadably positioned on each end of said mounting bolts to firmly seat said pair of clamping blocks against the end of said laminations.

8. The shock absorber of claim 1 wherein said at least one lamination is removably disposed in compression between said side members.

9. The shock absorber of claim 1 wherein said means carried by said side members is: a pair of anchor brackets mounted on each of said side members and a pair of clamping blocks in cooperation with said anchor brackets and said at least one lamination to removably secure said lamination between said side members and wherein:
   a. said at least one lamination is a plurality of laminations of said viscoelastic material and said leaf spring in alternating configuration;
   b. said at least one lamination of a viscoelastic material and leaf spring is bonded together; and
   c. said at least one lamination is removably disposed in compression between said side members.

10. The shock absorber of claim 1 wherein said means carried by said side members is:
    a. a spacer plate and a pair of anchor brackets mounted on each of said side members;
    b. a pair of clamping blocks in registering cooperation with said pair of anchor brackets and fitted against the ends of said at least one lamination;
    c. a pair of mounting bolts positioned in registration with apertures in said clamping blocks, said spacer plate and said ends of said at least one lamination;
    d. a pair of retaining nuts threadably positioned on each end of said mounting bolts to firmly seat said pair of clamping blocks against the ends of said laminations; and wherein said at least one lamination is removably disposed in compression between said side members.

* * * * *